Figure 1:
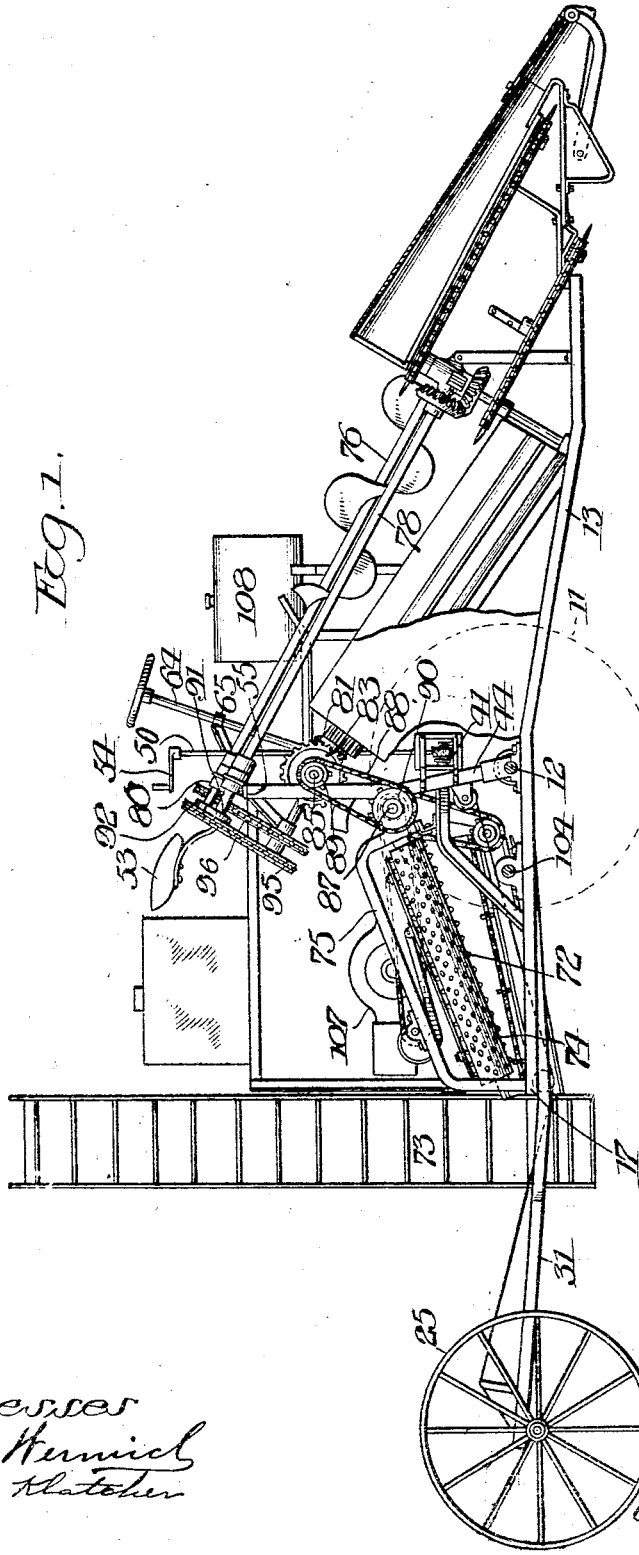

W. HIBBS
DRIVING MECHANISM FOR CORN HARVESTERS AND THE LIKE.
APPLICATION FILED JAN. 26, 1914.

1,142,036.

Patented June 8, 1915.
4 SHEETS—SHEET 1.

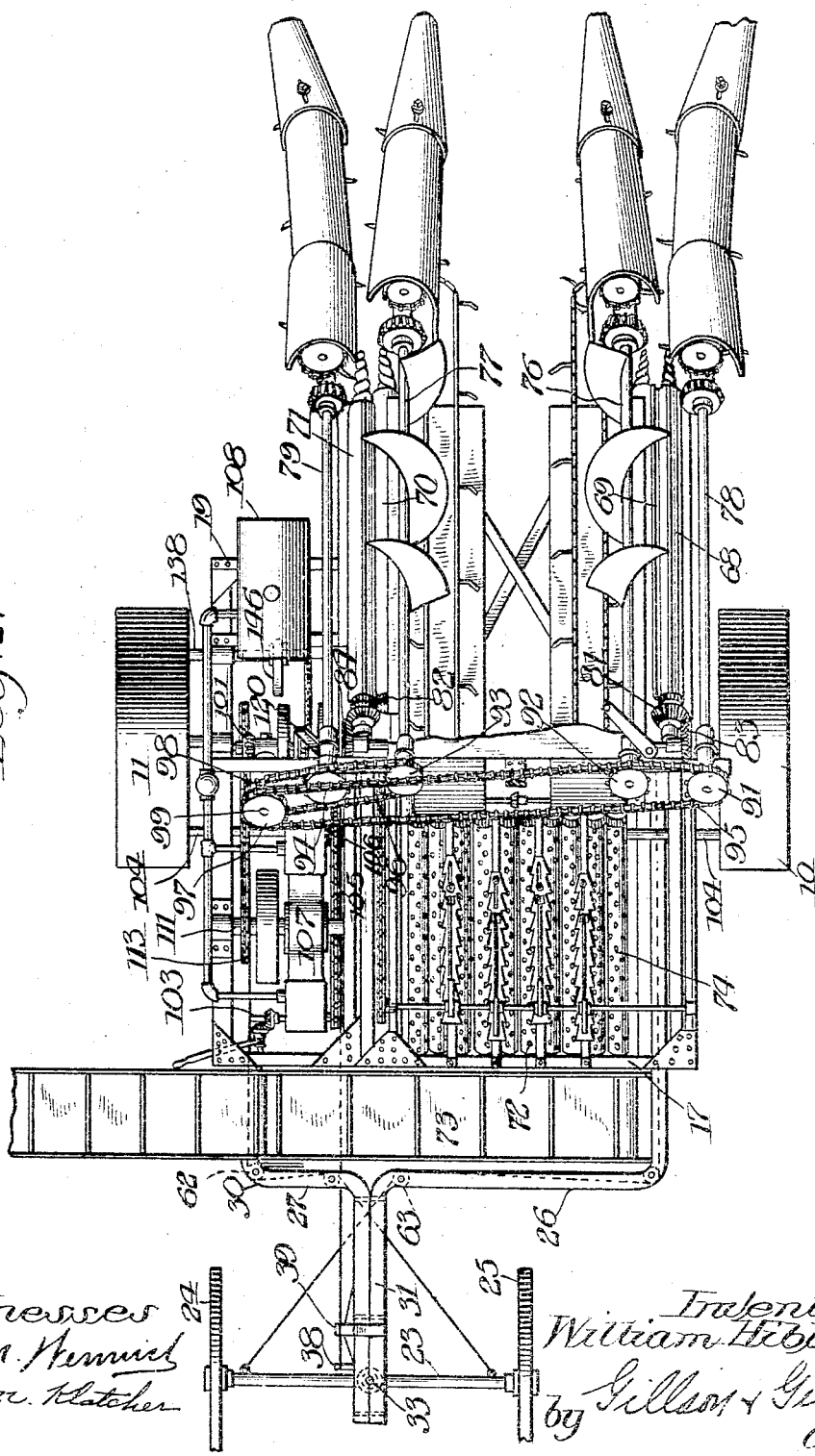

W. HIBBS.
DRIVING MECHANISM FOR CORN HARVESTERS AND THE LIKE.
APPLICATION FILED JAN. 26, 1914.
1,142,036.
Patented June 8, 1915.
4 SHEETS—SHEET 3.
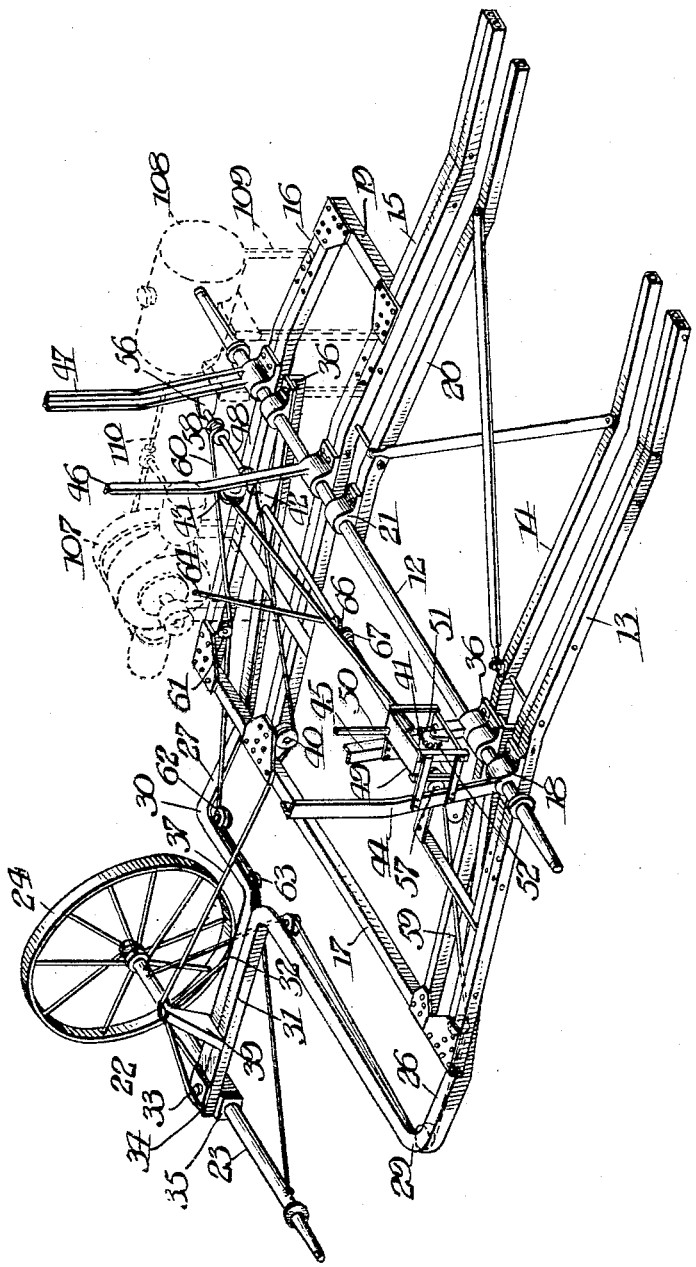

W. HIBBS.
DRIVING MECHANISM FOR CORN HARVESTERS AND THE LIKE.
APPLICATION FILED JAN. 26, 1914.
1,142,036.
Patented June 8, 1915.
4 SHEETS—SHEET 4.
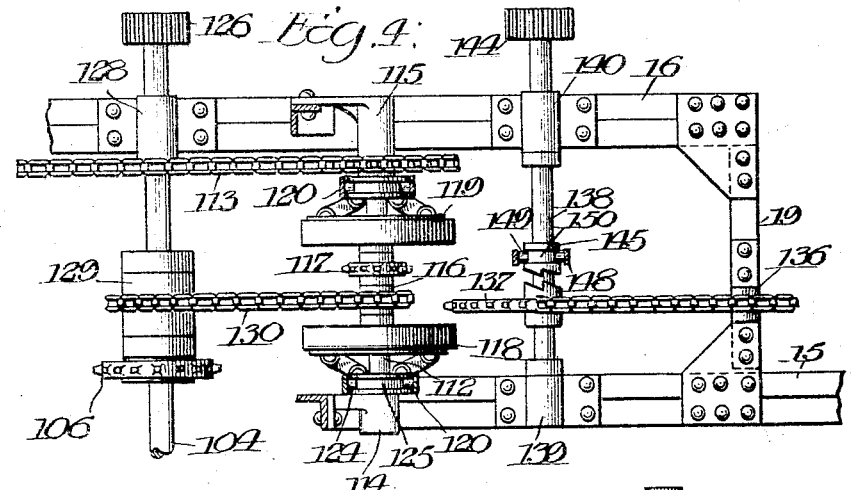
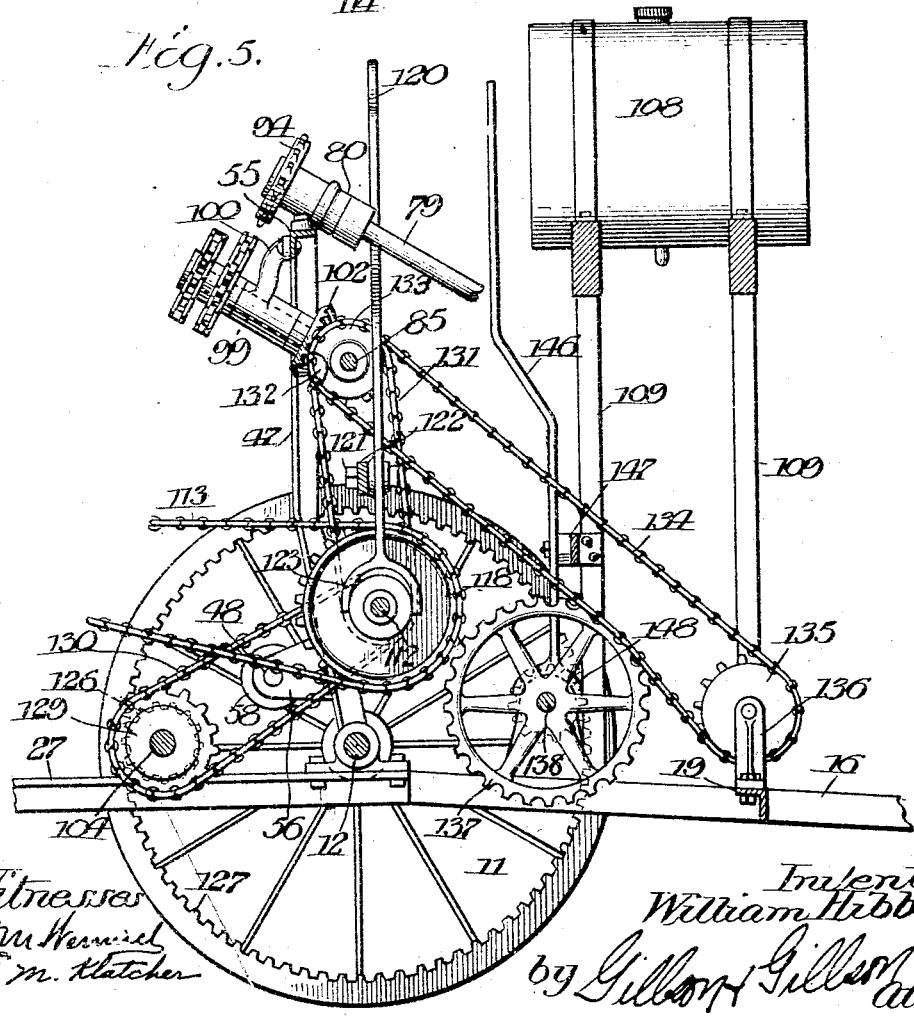

UNITED STATES PATENT OFFICE.

WILLIAM HIBBS, OF PLANO, ILLINOIS.

DRIVING MECHANISM FOR CORN-HARVESTERS AND THE LIKE.

1,142,085.   Specification of Letters Patent.   Patented June 8, 1915.

Original application filed July 20, 1911, Serial No. 639,563. Divided and this application filed January 26, 1914. Serial No. 814,388.

*To all whom it may concern:*

Be it known that I, WILLIAM HIBBS, a citizen of the United States, and resident of Plano, county of Kendall, and State of Illinois, have invented certain new and useful Improvements in Driving Mechanism for Corn-Harvesters and the like, of which the following is a specification, and which are illustrated in the accompanying drawings, forming a part thereof.

The invention relates to driving mechanism for corn harvesters and the like and has been divided out of the application for my patent on corn harvesters, No. 1,090,150 dated March 17, 1914.

The invention has for its object to provide improved means for propelling and driving the operative parts of a corn harvester. It accordingly contemplates an arrangement of operative and power transmitting parts particularly adapted to be associated with a motor mounted on the harvester frame.

In the accompanying drawings, Figure 1 is a side elevation of a corn harvester embodying a form of construction provided by the invention, the main carrying wheels of the harvester being removed and their position being indicated by dotted lines; Fig. 2 is a plan view of the machine illustrated in Fig. 1; Fig. 3 is a perspective view showing the frame work of the machine and certain of the power transmitting and steering elements, a gasolene motor and its fuel supply tank being shown in dotted lines; Fig. 4 is a detail plan view showing the parts employed for transmitting power to the traction wheels for driving the harvester in either direction, some of the upright members of the frame being shown in section, and Fig. 5 is a detail longitudinal sectional view illustrating the arrangement of power transmitting elements.

The invention is illustrated as being applied to a corn harvesting machine having provision for simultaneously harvesting the corn in two adjacent rows. The parts of the machine are properly supported upon a pair of traction wheels designated 10 and 11. These wheels are located at opposite sides of the machine and are preferably rotatably mounted upon the opposite ends of a non rotating main axle 12. The frame of the machine comprises side and intermediate sills, 13, 14, 15 and 16 and a rear end sill 17.

This frame is suspended from and arranged to tilt upon the axle 12. As shown, each of the side and intermediate sills 13, 14, 15 and 16 is provided with a bearing block 18 intermediate its ends for receiving the axle. The side sill 16 is desirably made shorter than the remaining longitudinal sills and has its forward end connected with the adjacent intermediate sill, as 15, by a transverse frame member 19. The main frame preferably also comprises an arm, 20, which extends forwardly from the axle 12, parallel with and adjacent to the intermediate sill 15. The arm 20 is desirably also provided with a bearing block, as 21, for receiving the axle 12. An upright frame member, as 44, 45, 46 and 47 is rigidly secured to and rises from each of the bearing blocks, 18. These upright frame members serve to support certain operative parts of the machine to be hereinafter described.

For steering the machine and supporting the main frame in angularly adjusted position a rear truck 22 is desirably provided. This truck is shown as comprising an axle 23, and carrying wheels 24 and 25 mounted upon the ends of the axle. A pair of rails 26, 27, serve for connecting the rear truck 22 with the axle 12. These rails are desirably spaced apart at their forward ends a distance equal to the width of the main frame but are each inwardly turned intermediate their ends, as indicated at 29, 30, and have their rear end portions, as 31, 32, in juxtaposition. A king bolt, 33, passes through a plate 34, which is mounted upon and serves for connecting the rear end portions 31, 32 of the rails 26, 27 and through a block 35 mounted on the axle 23 of the rear truck 22, and serves for pivotally connecting the rear truck with the rails 26, 27. Each of the rails 26, 27, is provided with a bearing block 36, at its forward end for receiving the axle, 12. The rails 26, 27, extend beneath the rear end sill 17 of the main frame and serve to limit the tilting movement of the main frame in one direction.

Any convenient mechanism reacting between the main frame and rear truck 22 may serve for tilting the frame. As shown, a cable 37, has one end secured to the rails 26, 27, adjacent their rear ends, as at 38, Fig. 2 and passes over an upright strut 39 mounted on the rear end portions 31, 32 of the rails 26, 27, and under a guide pulley 40, pivotally secured against the intermediate sill 15 adjacent its rear end. The forward end of the cable 37, is secured to a winding drum 41. This winding drum is desirably located adjacent one side of the machine and the cable is guided thereto by being passed over guide pulleys 42 and 43. The guide pulley 42 is conveniently supported by being loosely mounted upon a transverse shaft 48, to be hereinafter described. The guide pulley 43 is shown as being secured against one of the upright frame members, as 46. The winding drum 41 is shown as being journaled in the walls of a cage 49. This cage extends between and is carried by the upright frame members 44 and 45. An upright shaft 50, which extends through and is journaled in the upper and lower walls of the cage 49, is operatively connected with the winding drum 41 by a worm 51 formed on the shaft and worm wheel 52, formed on the end of the drum and serves for turning the drum to tilt the main frame. The higher end of the shaft 50 is located within convenient reach of the driver's seat, as 53, and is supplied with a hand crank 54. The driver's seat is supported in any convenient manner as by being mounted upon a horizontal frame member 55, which extends transversely over the machine and connects the higher ends of the upright frame members 44, 45, 46 and 47.

The shaft 48 preferably extends transversely across the frame and serves for turning the rear truck 22 to guide the machine. As shown, this shaft extends through and is journaled in a plurality of brackets 56, one of which is mounted upon each of the upright frame members 44, 45, 46 and 47. A pair of spools 57, 58, are mounted upon the shaft 48 adjacent its opposite ends. Each of these spools serves for receiving the forward end of a cable, as 59, 60. Each cable extends from the corresponding spool 57, 58 over guide pulleys 61, 62 and 63 to the remote end of the rear axle 23. Each of the guide pulleys 61 is secured against the adjacent side sill 13, 16. The guide pulleys 62 and 63 are secured against the corresponding rail 26, 27. The forward ends of the cables 59, 60 are preferably oppositely wound upon the spools 57, 58, and a steering post 64 is provided for turning the shaft 58, for swinging the axle 23 of the rear truck 22. The steering post 64 is supported in a substantially upright position adjacent the driver's seat 53, in any convenient manner as by being extended through and journaled in a bracket 65, carried by the frame member 55. The lower end of the steering post 64 is operatively connected with the shaft 48 by beveled gears 66, 67, one mounted on the steering post and the other on the shaft.

The operative parts of the machine preferably comprise two sets of snapping rolls 68, 69 and 70 and 74, a husking table 72 and a conveyer and elevator 73. Each of the snapping rolls extends along and is supported by one of the side or intermediate sills 13, 14, 15, or the arm 20, all as more fully appears in my said patent on corn harvesters, No. 1,090,150. The husking table 72 comprises a series of rolls 74 having their opposite ends supported by and journaled in a supplemental frame 75, as also appears in my said application for patent on corn harvesters. The conveyer and elevator 73 is supported by being secured against the rear end sill 17 and extends transversely between the rails 26, 27 in rear of said sill and upwardly beyond the rail 27 at one side of the machine. A screw conveyer as 76, 77 and shaft as 78, 79, the latter for driving certain of the gathering parts of the machine, extend over each set of snapping rolls as 68, 69 and 70, 71. Each of these parts is journaled adjacent its inner end upon a bearing bracket, as 80, mounted on the frame member 55.

The snapping rolls, as 68, 69, and 70 and 71, of each set are geared together and one of the rolls, as 68, 71, of each set is provided with a beveled gear, as 81, 82. Each of these beveled gears meshes with a beveled gear, as 83, 84, mounted on a counter shaft 85. The counter shaft, 85, extends transversely across the machine and is journaled on each of the upright frame members 44, 45, 46 and 47. A second counter shaft 87, which extends transversely across the machine and is journaled upon the upright frame members 44, 45, 46 and 47, is operatively connected with the counter shaft 85 by a sprocket chain 88, and serves for driving the rolls 74 of the husking table 72 and other parts of the husking mechanism in a manner more fully described in my said application for patent on corn harvesters.

The sprocket chain 88 is located adjacent one side of the machine and turns over sprocket wheels 89, and 90, which are mounted upon the counter shafts 85 and 87 respectively. The screw conveyers 76, 77 and shafts 78, 79, each has a sprocket wheel as 91, 92, 93 and 94, mounted upon its inner end. The screw conveyer 76, 77 and shaft 78, 79 associated with each set, as 68, 69 or 70, 71 of snapping rolls, are conveniently turned by a single sprocket chain, as 95, 96, which turns over the sprocket wheel, as 91, 93, mounted on one of said parts and engages the sprocket wheel 92, 94, mounted upon the other of said parts, intermediate its ends. The two sprocket chains 95, 96, turn about and are turned by sprocket wheels 97, 98, respectively, and both of the sprocket wheels 97, 98 are mounted upon a single shaft as 99. The shaft 99 extends through and is journaled in a bracket 100 (Fig. 5), which is secured against and is carried by the transverse frame member 55. The shaft 99 is rotated by being operatively connected with the counter shaft 85, through beveled gears 101, 102, one mounted on the counter shaft 85 and the other on the counter shaft 99.

For driving the conveyer and elevator 73, a counter shaft 103 is preferably provided. This counter shaft is shown as being journaled at its opposite ends in the intermediate and side sills 15, 16. The counter shaft 103 may be driven from any convenient part of the mechanism as from the propelling shaft 104, which is hereinafter described. As shown, a sprocket chain 105, turns over a sprocket wheel 106, mounted on the propelling shaft 104 and over a suitable sprocket mounted on the counter shaft 103.

The invention provides for the transmission of power for driving the operative parts already described and for propelling the supporting wheels in either direction from a motor which is preferably carried by the machine. Such a motor is indicated in the drawings at 107. It is shown as being supported upon the intermediate sill 15 and side sill 16 in rear of the axle 12. By locating the motor in this position, its weight serves in part to counter balance the weight of the operative parts of the machine which are located in front of the axle 12. Fuel for the motor is conveniently supplied from a tank 108. This tank is shown as being supported in an elevated position by standards, 109, which rise from the intermediate sill 15 and from the side sill 16 in front of the axle. A fuel pipe 110 extends from the tank 108 to the motor 107.

The crank shaft of the motor 107 is represented at 111. The main drive shaft is shown at 112. The drive shaft 112 is operatively connected with the crank shaft 111 of the motor by a sprocket chain 113. As shown, the main drive shaft 112 is journaled at its opposite ends in bearing brackets 114 and 115. These bearing brackets are mounted upon the upright frame members 46 and 47 respectively. Sprocket wheels 116, and 117, are loosely mounted upon the drive shaft 112. These sprocket wheels serve for transmitting power to the traction wheels 10, 11 and conveyer and elevator 73 and to the other operative parts of the machine respectively. To this end clutches 118 and 119 are mounted on the power shaft 112 for operatively connecting the sprocket wheels 116, 117, respectively, with said shaft. Each of these clutches is arranged to be controlled by a hand lever, as 120. The two hand levers 120 extend upwardly from their respective points of connection with the clutches, and are pivotally supported intermediate their ends, as at 121, Fig. 5, upon a tie plate 122, which extends between and is carried by the upright frame members 46, 47. Each hand lever 120 has its lower end bifurcated, as at 123 to straddle the hub of the corresponding clutch and is operatively connected with such hub to shift the clutch in any convenient manner as by means of instanding studs 124, which are mounted upon the lower end portion of the hand lever and run in a groove 125 formed in the hub of the clutch.

The propelling shaft, 104, receives power from the sprocket wheel 116, to turn the traction wheels 10, 11 in the proper direction for advancing the machine. This shaft extends transversely over and beyond the side of the frame. It is provided with a pinion, as 126, upon each end for engagement with an internal gear 127, formed within the rim of the corresponding traction wheel 10, 11. The propelling shaft is journaled in brackets, as 128, which are mounted upon each of the side sills 13 and 16 in rear of the axle, 12. A differential gear mechanism indicated at 129 is mounted upon the propelling shaft 104 and is operatively connected with the sprocket wheel 116 by a sprocket chain 130. The differential gear mechanism 129 may take any convenient form of construction. As such a mechanism is well understood it is not deemed necessary to illustrate the same in detail. It will also be understood that the propelling shaft 104 is formed in two sections, one section extending at each side of the differential gear mechanism 129, and it is therefore deemed unnecessary to illustrate this feature in detail.

The sprocket wheel 116 is operatively connected with the counter shaft 85. For this purpose a sprocket chain 131 (Fig. 5) turns over the sprocket wheel 117 and over a sprocket wheel 132 mounted on the counter shaft. The counter shaft 85 serves for transmitting power to the snapping rolls 68, 69, 70 and 71, to the screw conveyers 76, 77 and shafts 78, 79 and to the rolls 74 and other operative parts of the husking table 72, through the mechanisms heretofore described. The counter shaft 85 also serves for transmitting power to one of the traction wheels, as 11, when it is desired to propel the machine backwardly. For this purpose a sprocket wheel 133 (Fig. 5) is mounted on the counter shaft 85. A sprocket chain 134 turns over the sprocket wheel 133 and over the sprocket wheel 135 which is mounted in a bracket 136 carried by the transverse frame member 19. Intermediate its ends the sprocket chain 134 is engaged with a sprocket wheel 137. The sprocket wheel 137 is loosely mounted upon a second propelling shaft 138. The propelling shaft 138 is preferably of only such length as to be engaged with one of the traction wheels, as 11. As shown, it is journaled in bearing blocks 139 and 140, which are mounted on the intermediate sill 15 and side sill 16, respectively. At its outer end the propelling shaft 138 is supplied with a pinion 144. This pinion is continuously in mesh with the internal gear 127 of the traction wheel 11.

When it is desired to propel the machine backwardly the sprocket wheel 137 is rotatably connected with the propelling shaft 138. For this purpose a clutch 145 is mounted on the propelling shaft 138. This clutch is conveniently controlled by an upright hand lever 146. The hand lever 146 is pivotally supported intermediate its ends as upon a bracket 147 which is secured to one of the standards 109 (Fig. 5). The lower end of the hand lever 146 is bifurcated, as at 148 to straddle the hub of the clutch 145. Instanding studs 149 are formed upon the two arms of the bifurcate end of the hand lever 146 and a groove 150 is provided in the hub of the clutch 145 for receiving these studs.

The arrangement of clutches 118 and 119 permits of the operative parts of the machine and means for propelling the same in a forward direction to be controlled independently. Furthermore, the clutch 145 permits the machine to be propelled in a rearward direction while the several mechanisms of the machine are in operation. This last mentioned feature is of importance in permitting the machine to be released from an obstruction in the ground without interfering with the operations performed thereby.

I claim as my invention,

1. In a harvesting machine, in combination, a harvester frame, a traction wheel supporting the frame, means for tilting the frame upon the axis of the said traction wheel as a pivot, a gear carried by the traction wheel, two pinions carried by the frame and each meshing with the gear, a motor carried by the frame, mechanism operatively connecting the motor with each pinion, said mechanism being constructed to drive the pinions in opposite directions and each mechanism including a clutch.

2. In a corn harvester, in combination, a pair of frames pivotally connected upon a horizontal transverse axis, a traction wheel having its axis coincident with the axis of pivotal connection of the frames, an additional supporting wheel mounted in one of the frames, means for tilting the other frame upon the said axis, downwardly and forwardly inclined snapping rolls and a motor mounted in the last mentioned frame, the snapping rolls being located in front of the said axis, and driving connection between the motor and the snapping rolls and between the motor and the traction wheel whereby the elevation at which the snapping rolls operate is adjusted by the said tilting and neither of the said driving connections is disturbed by the said tilting.

3. In a corn harvester, in combination, a pair of frames pivotally connected upon a horizontal transverse axis, a traction wheel having its axis coincident with the axis of pivotal connection of the frames, an additional supporting wheel mounted in one of the frames, means for tilting the other frame upon the said axis, downwardly and forwardly inclined snapping rolls and a motor mounted in the last-mentioned frame at opposite sides of the said axis, the snapping rolls being located in front of the axis, and driving connection between the motor and the snapping rolls and between the motor and the traction wheel whereby the elevation at which the snapping rolls operate is adjusted by the said tilting, the weight of the snapping rolls is offset by that of the motor in making the said adjustment, and neither of the said driving connections is disturbed by the making of the said adjustment.

WILLIAM HIBBS.

Witnesses:
CHARLES B. GILLSON,
E. M. KLATCHER.